June 23, 1953     A. T. BERGQVIST     2,643,143
LOCKING DEVICE FOR TELESCOPIC STRUCTURES
Filed Jan. 5, 1949
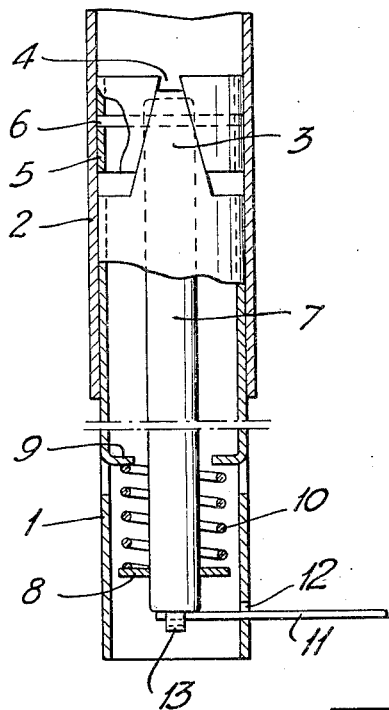
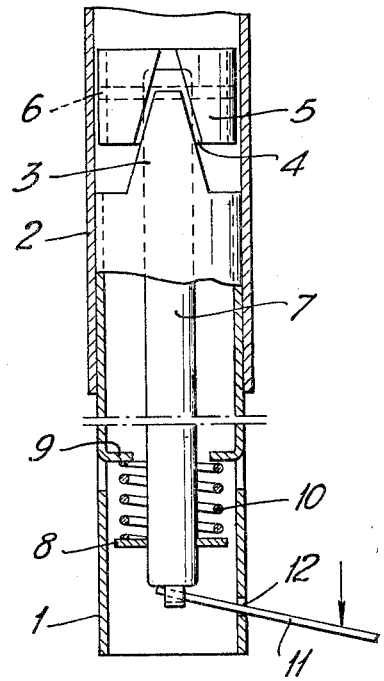
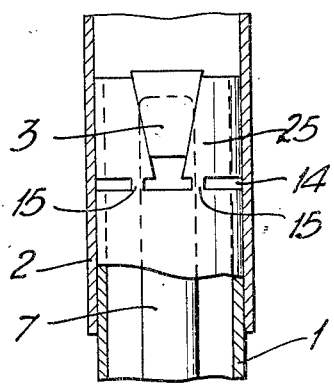
Inventor
Ake Torgny Bergqvist
by Sommers & Young
Attorneys

Patented June 23, 1953

2,643,143

UNITED STATES PATENT OFFICE 2,643,143

LOCKING DEVICE FOR TELESCOPIC STRUCTURES

Åke Torgny Bergqvist, Finspong, Sweden

Application January 5, 1949, Serial No. 69,340
In Sweden September 30, 1948

1 Claim. (Cl. 287—58)

The present invention relates to devices for locking elements, as tubes, of telescopic structures in any desired position with relation to each other.

More particularly, the invention has reference to that kind of such locking devices in which the inner one of two mutually engaging tubes is provided with a sleeve having a wedge-shaped slit engaged by a wedge, and in which said sleeve and said wedge may be displaced axially with relation to each other, so that the wedge may be caused either to expand the sleeve against the outer tube for locking the tubes to each other, or to allow the sleeve to contract for releasing the tubes from each other. The locking device according to the invention is of special advantage in such cases, where it has to resist heavy loads, such as when used in connection with different kinds of frames, supports for building purposes, adjustable trestles for tables and chairs, lifting jacks and mechanism tongs.

A principal feature of the invention resides in the provision of an externally operable controlling member for effecting the relative axial displacement of the wedge and the sleeve with relation to each other. Said controlling member may be operatively connected either with the wedge or with the sleeve.

The invention is illustrated in the accompanying drawings, in which:

Figs. 1 and 2 are longitudinal sections, with certain parts shown in elevation, of a locking device according to the invention as shown in locked and unlocked positions, respectively;

Fig. 3 is a similar section of a modified locking device.

With reference to Figs. 1 and 2, the numeral 1 designates the inner tube and 2 the outer tube of a telescopic structure. The end of the inner tube 1 engaging the outer tube 2 is formed with an integral wedge-shaped projection 3. Said projection, hereinafter referred to as the wedge, engages a similar slot 4 formed in a sleeve 5 slidably mounted in the outer tube 2, said slot extending from one end to the other of sleeve 5. By means of a transversely through-extending pin 6 the sleeve 5 is operatively connected to a controlling member which in the example shown comprises a tubular rod or a piece of a pipe 7 centraly positioned in the inner tube 1. Secured, as by welding, to the controlling member 7 near the bottom end thereof is a collar 8. Inserted between said collar and inwardly bent flaps 9 of tube 1 is a helical spring 10 tending to force the controlling member 7 downwards, thereby causing the sleeve 5 to engage the wedge 3 so as to be itself expanded until it comes into a firm contact with the inside of tube 2. Due to the friction between the sleeve 5 and the tube 2 and the engagement between the sleeve and the wedge, the tubes 1 and 2 are locked to each other against displacement towards each other. An increasement of the forces tending to push the tubes together only produces a more firm engagement between the sleeve 5 and the outer tube 2, that is to say, an increased load results in an improved locking action.

In order to release the locking device a lever 11 is provided which extends through a hole 12 formed in the wall of tube 1 at about the level of the bottom end of the controlling member 7, the bottom end of which may be provided with a strap 13 to receive the inner end of the lever 11. By depressing the lever, as shown in Fig. 2, the controlling member 7 may be raised with resulting lifting of the sleeve 5 out of engagement with the wedge 3. On leaving the wedge the sleeve is allowed to contract to its original diameter, thereby allowing an axial displacement of the tubes with relation to each other, since the sleeve does not press on the tube any longer.

In the modified embodiment shown in Fig. 3 the sleeve 25 is formed integrally with the tube 1. In order to render the sleeve-portion of tube 1 flexible it is slit, as shown at 14, so that there only remains small pin-like portions for connecting the tube proper to its sleeve-portion 25, as shown at 15. The wedge 3 is rigidly connected, as by welding, to the controlling member 7.

In case of structures in which the tubes are subjected to heavy turning moments it is preferred to profile the tubes so as to obtain a longitudinally extending inwardly projecting rib on the tube 2 in slidable engagement with a correspondingly profiled groove in tube 1 and sleeve 5.

What I claim is:

A locking device for telescopic structures comprising in combination, an outer tube, an inner tube slidably mounted in said outer tube, a sleeve member loosely mounted in said outer tube, said sleeve member being formed with a tapered slit extending along the entire length of the sleeve member to render it flexible, a wedge-shaped member movably mounted in the outer tube for engaging the slit of the sleeve member, one of said members being rigidly connected to the inner tube, means provided inside said inner tube for axially moving one of said relatively movable members with relation to the other of said members for causing the wedge member to engage the tapered slit of the sleeve member for expanding the sleeve upon movement of said means in one direction and allowing the sleeve to contract upon a movement of the said means in the other direction, a spring load on said means for effecting displacement thereof in said other direction, said inner tube being provided with a port in its wall, and a lever connected to said means and projecting beyond the inner tube through said port in the wall thereof for moving said means in the said first-mentioned direction against the action of said spring load.

ÅKE TORGNY BERGQVIST.

References Cited in the file of this patent

UNITED STATES PATENTS

| Number | Name | Date |
|---|---|---|
| 1,565,210 | Seiber | Dec. 8, 1925 |
| 1,852,785 | Moehler | Apr. 5, 1932 |
| 2,206,251 | Fischer | July 2, 1940 |
| 2,367,196 | Butler | Jan. 16, 1945 |

FOREIGN PATENTS

| Number | Country | Date |
|---|---|---|
| 600,216 | Great Britain | Apr. 2, 1948 |
| 718,486 | France | Jan. 25, 1932 |